2,830,068
Patented Apr. 8, 1958

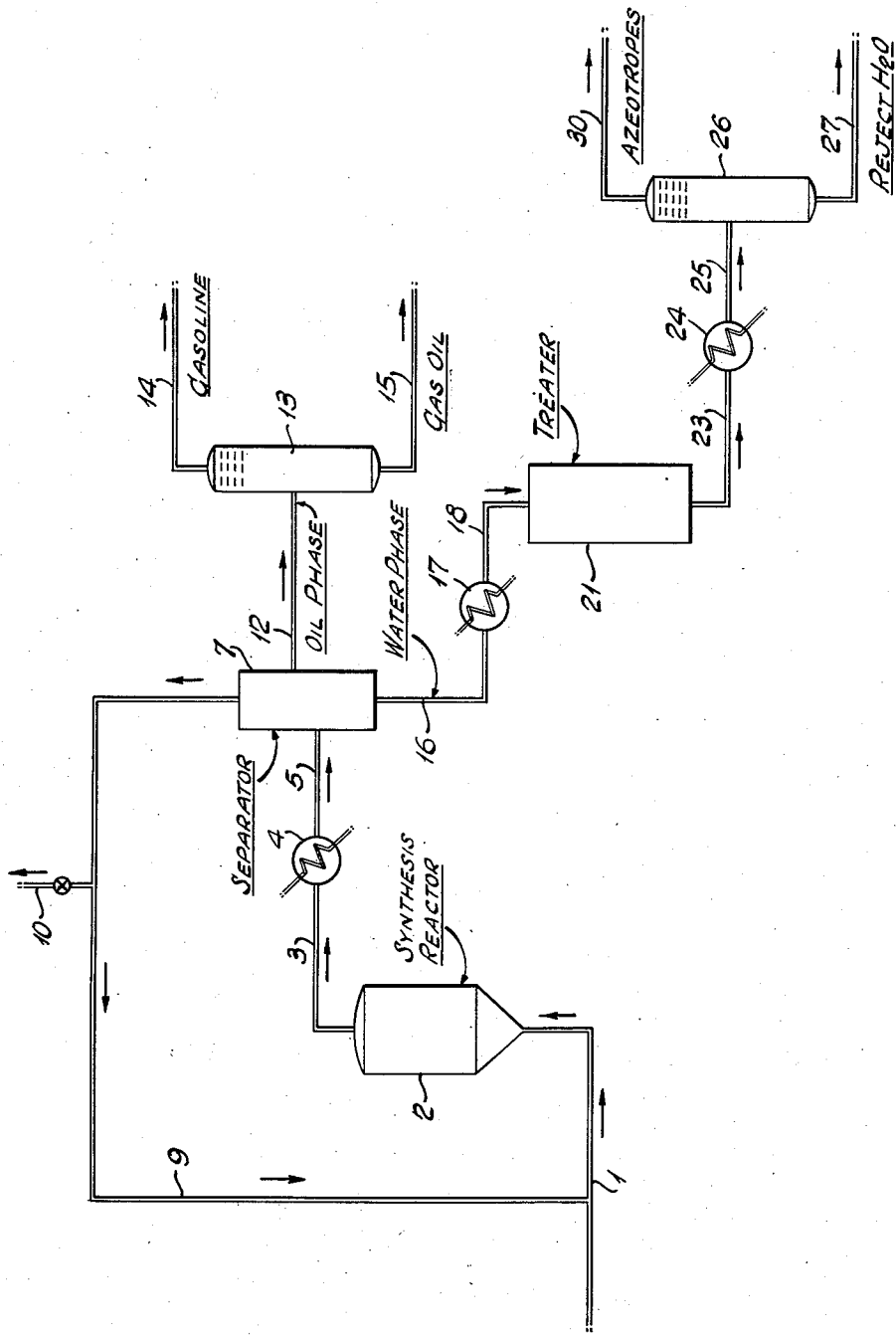

2,830,068
METHOD FOR TREATING CARBON MONOXIDE HYDROGENATION PRODUCT WITH BASIC MATERIAL

George B. Arnold, Fishkill, and Howard V. Hess, Glenham, N. Y., assignors to The Texas Company, New York, N. Y., a corporation of Delaware Application November 26, 1954, Serial No. 471,282

1 Claim. (Cl. 260—450)

This invention relates to a method for treating the product obtained by the catalytic conversion of carbon monoxide and hydrogen into synthetic fuel.

The catalytic conversion of carbon monoxide and hydrogen into synthetic fuel by contact with a fluidized iron catalyst at an elevated temperature of 500 to 750° F. and at a pressure of 100 to 500 pounds per square inch results in the formation of a product comprising a gas phase and a liquid phase, the latter consisting of approximately one part oil phase and two parts water phase. Oxygen-containing organic compounds such as alcohols, esters, acids, ketones and aldehydes are distributed throughout the two-phase liquid product; the molecular weight of the oxygen-containing compounds determines whether they are primarily found in the water phase or the oil phase. The oxygen-containing compounds found in the water phase comprise lower molecular weight oxygen-containing compounds such as $C_1$ to $C_6$ alcohols, esters containing up to about 4 carbon atoms and $C_2$ to $C_6$ organic acids with traces of the higher molecular weight compounds.

The disposal of this water phase in large scale commercial operations poses a serious problem since the aforementioned compounds comprise about 20 percent of the water phase and their presence would seriously pollute any stream or river into which the water phase is dumped. Moreover, these oxygen-containing organic compounds are valuable chemicals in their own right. The subject invention provides a method not only for recovery of the oxygen-containing organic compounds dissolved in the water phase, but it also purifies the water to such an extent that it can be poured into rivers and streams without fear of polluting them.

In accordance with the method of this invention, the product obtained by the catalytic conversion of carbon monoxide and hydrogen into synthetic fuel is separated into a gas phase, a water phase and an oil phase; advantageously, the separation of the product into the aforementioned component phases is effected at an elevated temperature of about 200 to 400° F. and at a pressure of about 150 to 500 pounds per square inch. The water phase is contacted in the vapor state at an elevated temperature of at least 500° F. with a basic compound of an alkali metal or an alkaline earth metal or with mixtures of such basic compounds. Contact of the water phase with the basic compound is effected at a space velocity of 1 to 10 liquid volumes of water phase per volume of basic compound per hour. The treatment of the water phase of the liquid product in the vapor state with a basic material selected from the aforedescribed group results in hydrolysis of the esters dissolved in the aqueous phase to alcohols and acids and in the decarboxylation of acids either to hydrocarbons or ketones. After contacting the water phase in vapor state with a basic material the vapor phase is cooled and flashed to remove aqueous azeotropes of alcohols, ketones and hydrocarbons therefrom.

The oil phase separated from the liquid product is subjected to treatment, such as solvent extraction, for the removal of oxygen-containing compounds dissolved therein. The gas phase is recycled to the reaction zone wherein carbon monoxide and hydrogen are converted into liquid hydrocarbons.

The liquid product consisting of oil and water phases obtained by the catalytic conversion of carbon monoxide and hydrogen into liquid hydrocarbons by contact with a fluidized iron catalyst at an elevated temperature of 500 to 750° F. and at a pressure of 100 to 500 pounds per square inch contains approximately 15 to 25 percent oxygen-containing organic compounds. The aqueous phase separated from the hydrocarbon phase at atmospheric conditions contains dissolved therein approximately 20 percent water-soluble oxygen-containing organic compounds. The distribution of oxygen-containing compounds is illustrated by percentage concentrations of the various oxygen-containing compounds in the aqueous phase which are approximately as follows: 12 percent alcohols, 3 percent acids, 3 percent esters, 1 percent aldehydes and 1 percent ketones. It will be noted that alcohols form the major portion of the oxygen-containing organic compounds in the water phase with acids and esters also comprising a substantial portion; aldehydes and ketones, on the other hand, are only present in minor quantities in the aqueous phase.

As was indicated previously, the separation of the product obtained by the catalytic conversion of carbon monoxide and hydrogen into synthetic fuel is advantageously effected at elevated temperatures of 200 to 400° F. and at a pressure of about 150 to 500 pounds per square inch. As is disclosed in U. S. Patent No. 2,605,276, the separation of the product into a gas phase, a water phase and an oil phase at the aforementioned elevated temperatures and pressures effects a displacement of non-acidic normally water-soluble oxygen-containing organic compounds such as low molecular weight alcohols, esters, aldehydes and ketones from the aqueous phase to the oil phase. The acids normally present in the water phase are not affected by the separation of the product at elevated temperature and pressure. Accordingly, the aqueous phase separated from the liquid product at elevated temperature and pressure contains approximately 8 percent of oxygen-containing organic compounds. The distribution of the various species of oxygen-containing organic compounds in this fraction is indicated by the percentage concentrations which are approximately 2 percent alcohols, 4 percent acids, 1 percent esters, 0.5 percent aldehydes and 0.5 percent ketones. It will be noticed that there is a substantial decrease in the overall oxygen-containing compound content of the aqueous phase and that the alcohol, ester, aldehyde and ketone percentages decrease while the acid percentage increases. Because the high temperature-pressure separation decreases the percentage of oxygen-containing organic compounds present in the aqueous phase, it is proposed as the preferred mode of separation in the subject invention.

An outstanding feature of the subject invention is that hydrolysis of the esters contained in the aqueous phase is effected in the vapor state. The vapor phase hydrolysis of esters at elevated temperatures over a solid basic material of the type heretofore described is a surprising and advantageous result of the process of the subject invention.

The water phase, after treatment in the aforedescribed manner, is practically free from oxygen-containing compounds. Consequently, its disposal does not present a problem since it may be emptied into a river or a stream without fear of causing pollution. Not only is the water phase purified to such an extent that its disposal does not present any problem, but also there is realized a substantial recovery of the water-soluble oxygen-containing compounds. The alcohols and ketones present in the aqueous phase are substantially unaffected by its treatment with a basic material in the aforedescribed manner. Aldehydes which are in the aqueous phase in small concentration are polymerized to high molecular weight materials which undergo cracking. Esters are hydrolyzed to alcohols and acids. Acids initially present in the aqueous phase, together with the acids formed by ester hydrolysis, are decarboxylated either to hydrocarbons or ketones. The flashing of the aqueous phase recovers alcohols, ketones and hydrocarbons present in the aqueous phase after it has been contacted with a basic material under the aforedescribed conditions.

Alkali metal hydroxides, alkali metal oxides, alkali metal salts, alkaline earth metal hydroxides, alkaline earth oxides and alkaline earth salts are included among the basic compounds which can be employed to effect the vapor phase alkaline treatment of the aqueous phase of the product obtained by the conversion of carbon monoxide and hydrogen into synthetic fuel. Both alkali metal compounds and alkaline earth metal compounds effect vapor phase hydrolysis of esters to alcohols and acids. Basic alkali metal compounds and basic mixtures of alkaline earth metal and alkali metal compounds decarboxylate acids formed by ester hydrolysis and acids initially present in the aqueous phase to hydrocarbons; on the other hand, basic alkaline earth metal compounds decarboxylate acids formed by ester hydrolysis and acids originally present to ketones.

While both basic alkaline metal compounds and basic alkaline earth metal compounds effect sufficient clarification of the aqueous phase so that it may be disposed of without resulting pollution of body of water into which it is poured, the alkali metal group of compounds are preferred because they are more efficient. A quicker and more complete clarification of the aqueous phase can be effected with the alkali metal compounds than with alkaline earth metal compounds. As a consequence, a larger quantity of water phase can be treated in a unit of time with alkali metal compounds than with alkaline earth metal compounds. Sodium carbonate, sodium phosphate, potassium carbonate, potassium phosphate, sodium hydroxide and potassium hydroxide are examples of basic alkali metal compounds which can be employed in the process of this invention. Sodium carbonate and sodium phosphate are particularly preferable compounds for use in the method of this invention; not only are these compounds particularly active in effecting clarification of the aqueous phase, but they are also inexpensive chemicals. Calcium oxide, calcium carbonate, barium oxide and barium carbonate are examples of basic alkaline earth metal compounds used in this invention. Calcium oxide and calcium carbonate are preferred alkaline earth metal compounds.

The contacting of the aqueous phase with a basic compound is effected at a temperature between 500 and 1,000° F. It has been found that temperatures between 600 and 800° F. are preferred. It is advisable to employ temperatures in the upper part of the operating range, that is, temperatures of 700 to 1,000° F. with alkaline earth metal compounds, whereas temperatures between 500 and 800° F. are advantageous with an alkali metal compound.

Pressures ranging from atmospheric to about 500 pounds per square inch may be employed for the basic treatment of the aqueous product of $H_2$-CO conversion into synthetic fuel. Atmospheric pressure is ordinarily employed.

In order to effect ester hydrolysis and acid decarboxylation during the contact of the vaporized aqueous phase with the solid basic compound, space velocities between about 1 and 10 volumes of liquid aqueous solution per volume of solid basic compound per hour are specified. Contact of the aqueous phase with the basic compound is usually effected at space velocities falling between 2 and 5 volumes of liquid aqueous solution per volume of solid basic compound per hour. As a general proposition, higher space velocities are used with alkali metal compounds than with alkaline earth metal compounds as the solid contacting agent.

It is possible to effect the vapor phase contacting of the aqueous product of $H_2$-CO conversion in accordance with any of the usual techniques for catalytic vapor phase contacting. Accordingly, the aqueous product can be passed through a fixed bed of solid basic material maintained at a temperature between 500 and 1,000° F., or the aqueous product in the vapor phase can be contacted with a fluidized bed of basic material particles. The vaporized aqueous product can also be contacted with a moving bed of basic material particles or with a stirred bed of basic material particles.

The effect of contacting the aqueous phase in the vapor state with a basic material of the described type is illustrated by the substantial increase in alcohol content, and substantial decrease in acid and ester content of an aqueous phase after treatment with sodium carbonate at a temperature of approximately 650° F. The aqueous phase after separation at elevated temperature of approximately 250° F. and elevated pressure of approximately 250 pounds per square inch from the liquid conversion product had an alcohol content of 2 volume percent, an acid content of 4 volume percent, and an ester content of 1 volume percent. After contacting with a fixed bed of sodium carbonate at a temperature of 650° F., a space velocity of 2 volumes of liquid aqueous phase per volume of basic material per hour, the alcohol content was 3 volume percent, the acid content was less than 0.1 volume percent and the ester content was less than 0.1 volume percent. The decrease in the acid and ester content and the increase in the alcohol content are significant. The alcohols, ketones and hydrocarbons can be readily removed from the aqueous phase in the form of water azeotropes by flashing.

In the accompanying figure, there is presented a flow diagram wherein the process of the subject invention is presented in detail. In the description of this flow diagram, separation of the product of CO-$H_2$ conversion into gas, water and oil phases is effected at elevated temperature and pressure since this is the preferred modification of the invention.

Hydrogen and carbon monoxide are introduced through a pipe 1 into a synthesis reactor 2 wherein conversion of carbon monoxide and hydrogen into liquid hydrocarbons is effected by contact with an iron catalyst maintained in a fluid state at a temperature between 500 and 700° F. and at a pressure of 150 to 500 pounds per square inch.

An effluent comprising unconverted hydrogen and carbon monoxide, carbon dioxide, products of reaction comprising water, gaseous and liquid hydrocarbons, and oxygen-containing organic compounds issues from the synthesis reactor 2 through a pipe 3 and is introduced into a heat exchanger 4 wherein the product is cooled to a temperature between 150 and 400° F. and preferably to a temperature between 200 and 300° F. without any reduction in pressure. Thereafter the effluent is introduced through a pipe 5 into a separator 7 maintained at a temperature between 150 and 400° F. and preferably at 200 to 300° F. and at a pressure between 150 and 500 pounds per square inch. Advantageously, the separator is maintained at approximately the same pressure as is employed for conversion of carbon monoxide and hydrogen in the synthesis reactor 2. In the separator 7, the effluent is separated into a gas phase, an oil phase and a water phase. As indicated previously, the elevated temperature and pressure separation of the product effects displacement of non-acidic normally water-soluble oxygen-containing organic compounds from the aqueous phase to the oil phase.

The gas phase is removed from the separator 7 through a pipe 9 through which it is recycled to the synthesis reactor 2 so that a recycle ratio between about 1:1 and 5:1 may be maintained. A draw-off pipe 10 affords means of withdrawing that portion of the gas phase which is not recycled.

The oil phase is withdrawn from the separator 7 through a pipe 12 and is introduced into a fractionator 13 wherein it is fractionated into a gasoline and a gas oil phase. The fractionation of the oil phase into a gasoline and gas oil phase expedites the separation of the oxygen-containing organic compounds from the oil phase. The oxygen-containing compounds present in the gasoline fraction may be solvent extracted whereas it is advisable to employ silica gel adsorption for the separation of the oxygen-containing compounds from the gas oil fraction. Gasoline and gas oil fractions are removed from separator 13 through pipes 14 and 15 respectively.

The aqueous phase is withdrawn from the separator 7 through a pipe 16 and introduced into a heat exchanger 17 wherein it is heated to a temperature of approximately 500 to 1,000° F. and preferably to a temperature between 600 and 800° F. Thereafter the aqueous phase which is still under pressure of approximately 200 to 300 pounds per square inch is introduced through a pipe 18 into a base treater 21 maintained at a temperature of between 500 and 1,000° F. and at atmospheric pressure.

In the base treater 21, the aqueous phase in the vapor state contacts a basic compound of an alkali metal or of an alkaline earth metal or mixtures of such compounds. For purposes of description, it will be assumed that the base treater 21 contains an alkali metal salt, for example, sodium carbonate. The basic treatment of the aqueous phase in the vapor state with sodium carbonate hydrolyzes the esters to alcohols and acids and decarboxylates the acids initially present together with those formed by ester hydrolysis to form hydrocarbons.

The aldehydes present in the aqueous phase are polymerized by the vapor phase contacting with sodium carbonate and are then cracked to smaller molecular weight hydrocarbons. The alcohols and ketones present in the aqueous phase are substantially unaffected with the exception that the alcohol content is substantially increased by the hydrolysis of the esters.

After contacting with sodium carbonate in the base treater 21, the aqueous phase substantially free from acids, esters and aldehydes, but containing an increased quantity of alcohols and hydrocarbons, is introduced through a pipe 23 into a heat exchanger 24 wherein it is reduced to a temperature of about 200° F. Thereafter, the aqueous phase is introduced through a pipe 25 into a stabilizer 26 wherein aqueous azeotropes of alcohols, ketones and hydrocarbons are flashed from the aqueous phase. After removal of the azeotropes of alcohols, ketones and hydrocarbons by flashing, the aqueous phase has an alcohol content of less than 1.0 volume percent, an acid content of less than about 0.1 volume percent and an ester content of less than about 0.1 volume percent. The water phase thus substantially free from organic compounds may be rejected through the pipe 27 and poured into a nearby body of water without danger of polluting it.

The azeotropes of alcohols, ketones and hydrocarbons are removed from the stabilizer 26 through a pipe 30. Thereafter they may be separated by fractional distillation into individual constituents.

It will be understood that the foregoing detailed description is merely illustrative of the process of the subject invention and is not intended as any limitation thereon. As indicated previously, the separation of the product obtained by the conversion of hydrogen and carbon monoxide into synthetic fuel can be separated into a gas phase, an oil phase and a water phase at atmospheric conditions prior to the treatment of the aqueous phase with a basic material in accordance with the method of this invention. Moreover, a basic alkaline earth metal compound such as calcium oxide or calcium carbonate can be employed in the vapor phase basic treatment of the aqueous phase rather than an alkali metal compound, as was employed in the detailed description of the invention in connection with the drawing. The use of a basic alkaline earth metal compound will increase the ketone content of the aqueous phase, together with the alcohol content, and both alcohols and ketones can be flashed from the aqueous phase.

This application is a continuation in part of our co-pending application Serial No. 68,462, filed December 31, 1948, now U. S. Patent No. 2,707,192.

Obviously many modifications and variations of the invention, as hereinbefore set forth, may be made without departing from the spirit and scope thereof and, therefore, only such limitations should be imposed as are indicated in the appended claim.

We claim:

A process for treating a separating water phase from a catalytic conversion of carbon monoxide and hydrogen into synthetic fuel, said water phase containing oxygenated hydrocarbons including alcohols, acids, esters, aldehydes, and ketones, said process comprising: passing said separated water phase as a vapor feed into a reaction zone; therein contacting said vapor feed with a bed of solid basic inorganic material selected from the group consisting of basic alkali metal compounds, basic alkaline earth metal compounds and mixtures thereof, said contacting being effected at a temperature of 500° to 1000° F. and at a space velocity of 1 to 10 liquid volumes of said water phase feed per volume of said solid basic compound per hour, thereby, in a medium of water vapor, hydrolyzing esters and decarboxylating acids into conversion products; and removing the conversion products from said reaction zone in said medium of water vapor.

References Cited in the file of this patent

UNITED STATES PATENTS

| | | |
|---|---|---|
| 2,452,121 | Grahame | Oct. 26, 1948 |
| 2,591,699 | Hess et al. | Apr. 8, 1952 |
| 2,595,223 | Burton et al. | May 6, 1952 |
| 2,707,192 | Arnold et al. | Apr. 26, 1955 |